Sept. 26, 1944.  L. G. FLOTO  2,358,918.
WORK CHUCK
Filed Aug. 2, 1943   2 Sheets-Sheet 1
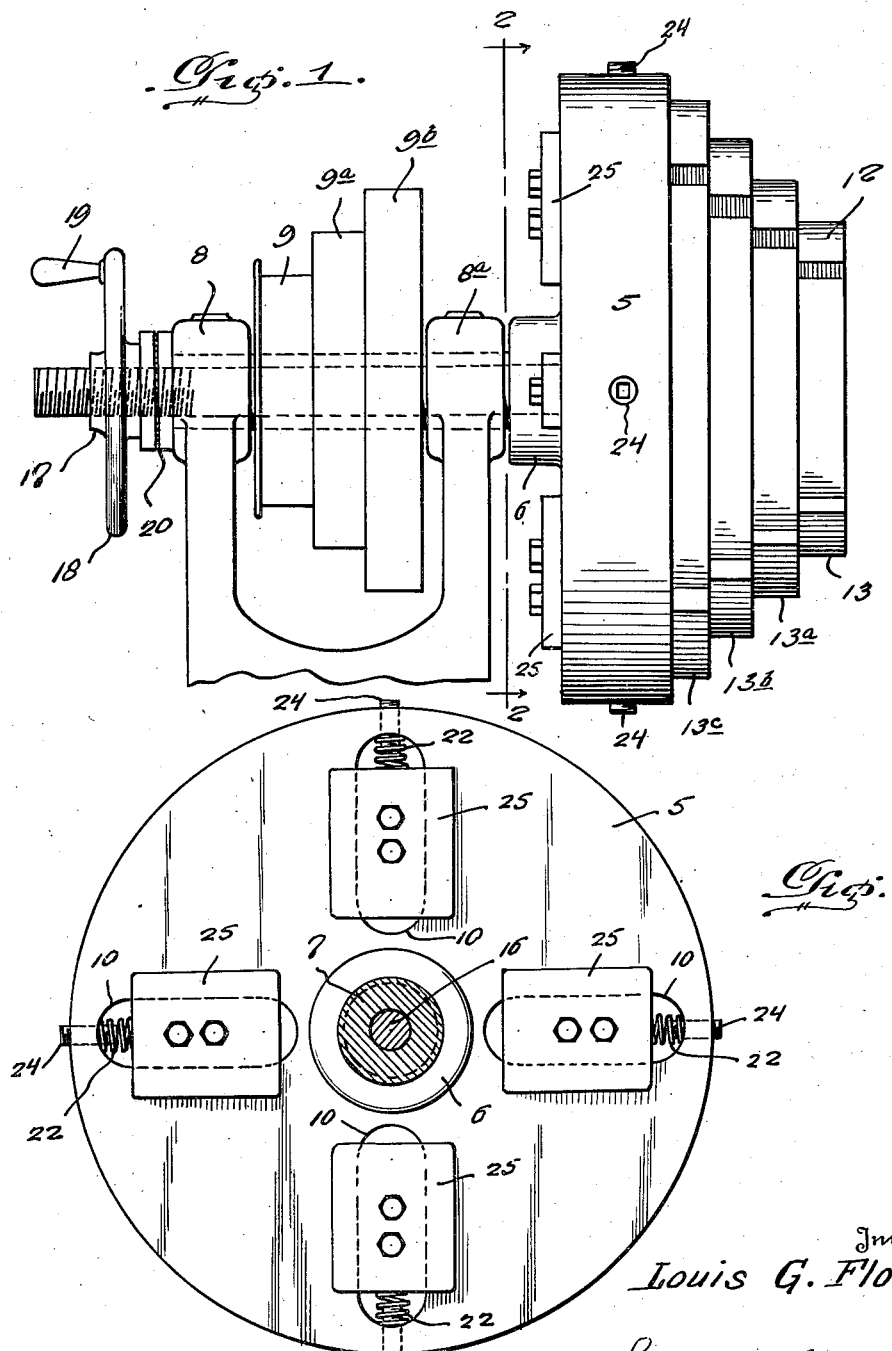
Inventor
Louis G. Floto,
By J. Stanley Burch
Attorney Sept. 26, 1944.  L. G. FLOTO  2,358,918
WORK CHUCK
Filed Aug. 2, 1943  2 Sheets-Sheet 2
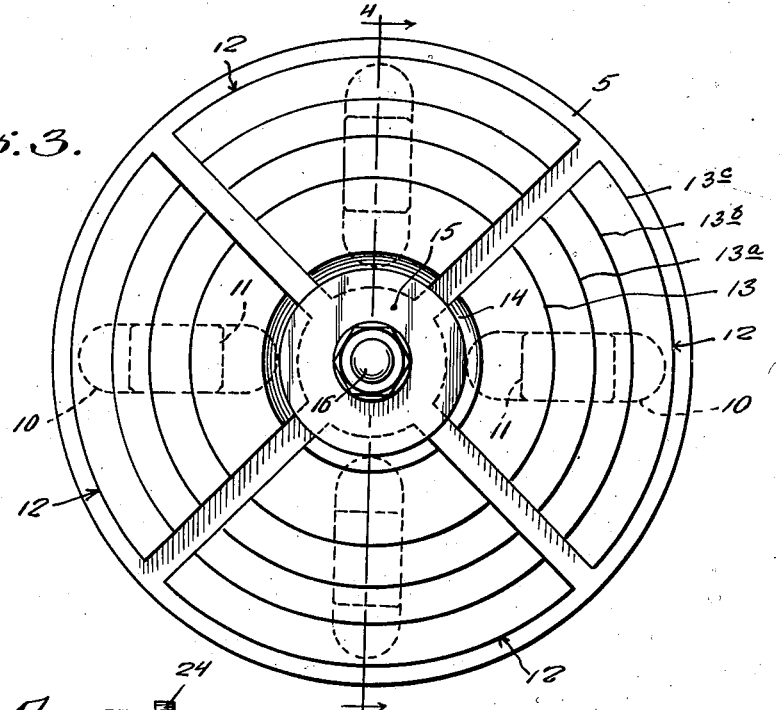
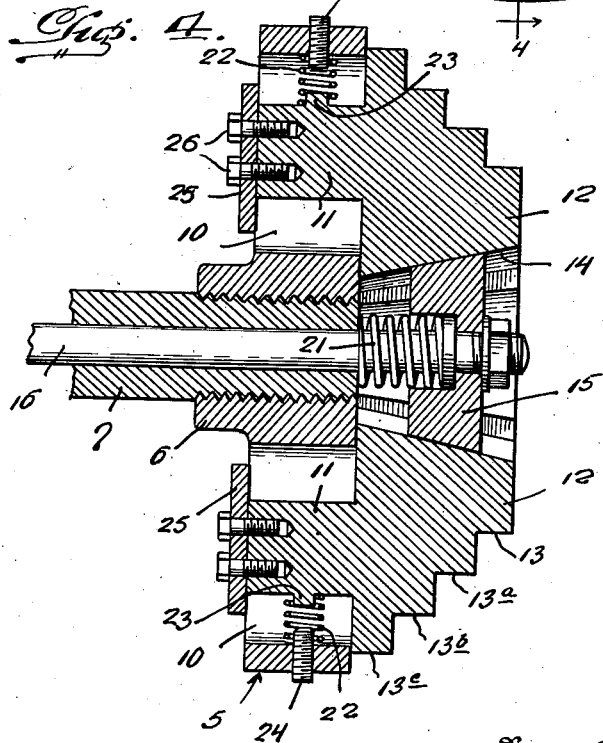
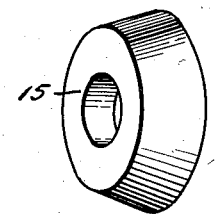
Inventor
Louis G. Floto,
By J. Stanley Burch
Attorney Patented Sept. 26, 1944

2,358,918

UNITED STATES PATENT OFFICE 2,358,918

WORK CHUCK

Louis G. Floto, Steubenville, Ohio

Application August 2, 1943, Serial No. 497,075

1 Claim. (Cl. 279—2)

This invention relates to work chucks for lathes, and the like.

The primary object of the invention is to provide an improved chuck of the above kind, which is adapted to effectively hold and center tubular work, and which is positive and accurate in action.

With the above general object in view, and others that will appear when the nature of the invention is better understood, the present invention consists in the novel form, combination and arrangement of parts hereinafter more fully described, shown in the accompanying drawings, and claimed.

In the drawings:

Figure 1 is a side elevation view showing a chuck embodying the present invention.

Figure 2 is a vertical transverse section on line 2—2 of Figure 1.

Figure 3 is an elevation looking toward the left of Figure 1.

Figure 4 is a section on line 4—4 of Figure 3; and

Figure 5 is a perspective view of the frusto-conical jaw-expanding member of the chuck shown in Figures 1 to 4 inclusive.

Referring in detail to the drawings, the present chuck includes a disk 5 having a hub 6 threaded onto the forward end of a tubular spindle or shaft 7, journaled in spaced bearings 8 and 8a of a lathe or the like, and adapted to be driven at various speeds by a driving belt selectively engageable with a desired one of three pulleys of different sizes secured on the spindle or shaft 7 between the bearings 8 and 8a, as at 9, 9a, and 9b.

The disk 5 has four equally spaced radially arranged elongated slots 10, in each of which is slidably fitted a rearwardly projecting lug 11 of a segmental work engaging jaw 12 having a plurality of arcuate stepped work-engaging surfaces 13, 13a, 13b, and 13c. There are preferably four similar jaws 12 which co-operate to provide a plurality of substantially cylindrical surfaces to receive tubular work of various internal diameters. The inner faces of jaws 12 are arcuate and tapered larger forwardly as at 14, and engaging these faces is the periphery of a frusto-conical jaw-expanding member 15 secured on the forward end of a rod 16 slidably extending through shaft 7. Thus, upon pulling the rod 16 rearwardly, the jaws 12 may be radially expanded to increase the range of work capable of being held thereby and to tightly engage the inner surface of any piece of tubular work slipped onto any of the surfaces 13, 13a, 13b or 13c of the jaws 12.

For drawing the member 15 rearwardly to expand the jaws, a nut member 17 having an operating wheel 18 and handle 19, is threaded on the rear end of rod 16 and has an antifriction bearing interposed between it and the bearing 8, as at 20.

A spring 21 is interposed between the member 15 and the forward end of shaft 7 to urge the member 15 forwardly and permit contraction of jaws 12 when the rod 16 is allowed to move forwardly by turning nut 17 in one direction. Obviously, nut 17 is turned in the opposite direction to draw the rod 16 and member 15 rearwardly against the action of spring 21, in order to expand jaws 12.

Springs 22 are radially arranged between the outer walls of slots 10 and the lugs 11 to contract the jaws 12 when the member 15 is moved forwardly. These springs are engaged at their ends over studs 23 on lugs 11 and the inner ends of screws 24 threaded through the outer end walls of slots 10. Plates 25 are secured by screws 26 or the like, on the rear or inner ends of lugs 11 and overlap the rear face of disk 5 at opposite sides of slots 10, to secure the jaws 12 in assembled relation to said disk 5.

From the foregoing description, it is believed that the construction and operation, as well as the advantages of the present invention, will be readily understood and appreciated by those skilled in the art. The device is simple, durable, and efficient, and offers an internal chuck, for tubular work, which is easy to operate and use.

What I claim is:

A work chuck of the character described, comprising a tubular shaft, a disk secured on one end of said shaft, and having a plurality of equally spaced radial elongated slots, a plurality of segmental jaws each having a plurality of arcuate stepped work engaging surfaces and a rearwardly projecting lug slidably fitted in one of said slots, compression springs acting upon said lugs at the outer sides of the latter to normally yieldingly urge said jaws radially inwardly to contracted position, said jaws further having arcuate inner faces tapered larger forwardly, a frusto-conical expanding member engaging said inner conical expanding member and movable rearwardly to expand the jaws, a rod slidable through said tubular shaft and carrying said expanding member, means to move said rod to expand said jaw, and a spring interposed between said tubular shaft and said expanding member to urge the latter forwardly and permit contraction of said jaws, studs on the outer sides of said lugs, screws threaded through the outer walls of said slots, each of said compression springs having its ends respectively engaged over one of said studs and one of said screws, and plates secured on the inner ends of said lugs and overlapping the rear face of said disk at opposite sides of said slots.

LOUIS G. FLOTO.